(12) United States Patent
Kobayashi

(10) Patent No.: US 6,404,556 B1
(45) Date of Patent: Jun. 11, 2002

(54) OPTICAL SYSTEM

(75) Inventor: Hiroyoshi Kobayashi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/571,550

(22) Filed: May 16, 2000

(30) Foreign Application Priority Data

May 18, 1999 (JP) .......................................... 11-137735

(51) Int. Cl.$^7$ .......................... G02B 27/14; G02B 27/12
(52) U.S. Cl. ...................... 359/630; 359/631; 359/633; 359/636; 359/640
(58) Field of Search ................................ 359/630–640

(56) References Cited

U.S. PATENT DOCUMENTS

| | | | | |
|---|---|---|---|---|
| 5,683,480 A | * | 11/1997 | Taniguchi | 65/17.2 |
| 6,084,715 A | * | 6/2000 | Aoki | 359/627 |
| 6,161,666 A | * | 6/2000 | Raillson | 359/630 |
| 6,239,915 B1 | * | 5/2001 | Takagi | 359/629 |

FOREIGN PATENT DOCUMENTS

| | | |
|---|---|---|
| JP | 7-333551 | 12/1995 |
| JP | 9-73005 | 3/1997 |

* cited by examiner

*Primary Examiner*—Georgia Epps
*Assistant Examiner*—Michael Lucas
(74) *Attorney, Agent, or Firm*—Pillsbury Winthrop LLP

(57) ABSTRACT

This invention discloses an optical system which comprises first positioning and connecting portions which are formed by an integral molding on left and right side surfaces of an incidence surface of a second prism while having steps above an incidence surface and includes small bolt holes and positioning pins and second positioning and connecting portions which are formed by an integral molding at both left and right sides of a projection surface of the first prism such that they extend from the both left and right sides from the projection surface and includes small bolt holes and small bolt fitting holes, wherein the positioning pins are fitted into the positioning pin fitting holes and the lower surfaces of the second positioning and connecting portions are brought into contact with the upper surfaces of the first positioning and connecting portions, and thereafter, small bolts are made to pass through and are threaded into the small bolt holes thus integrally connecting the first prism and the second prism each other while aligning them with each other.

20 Claims, 16 Drawing Sheets

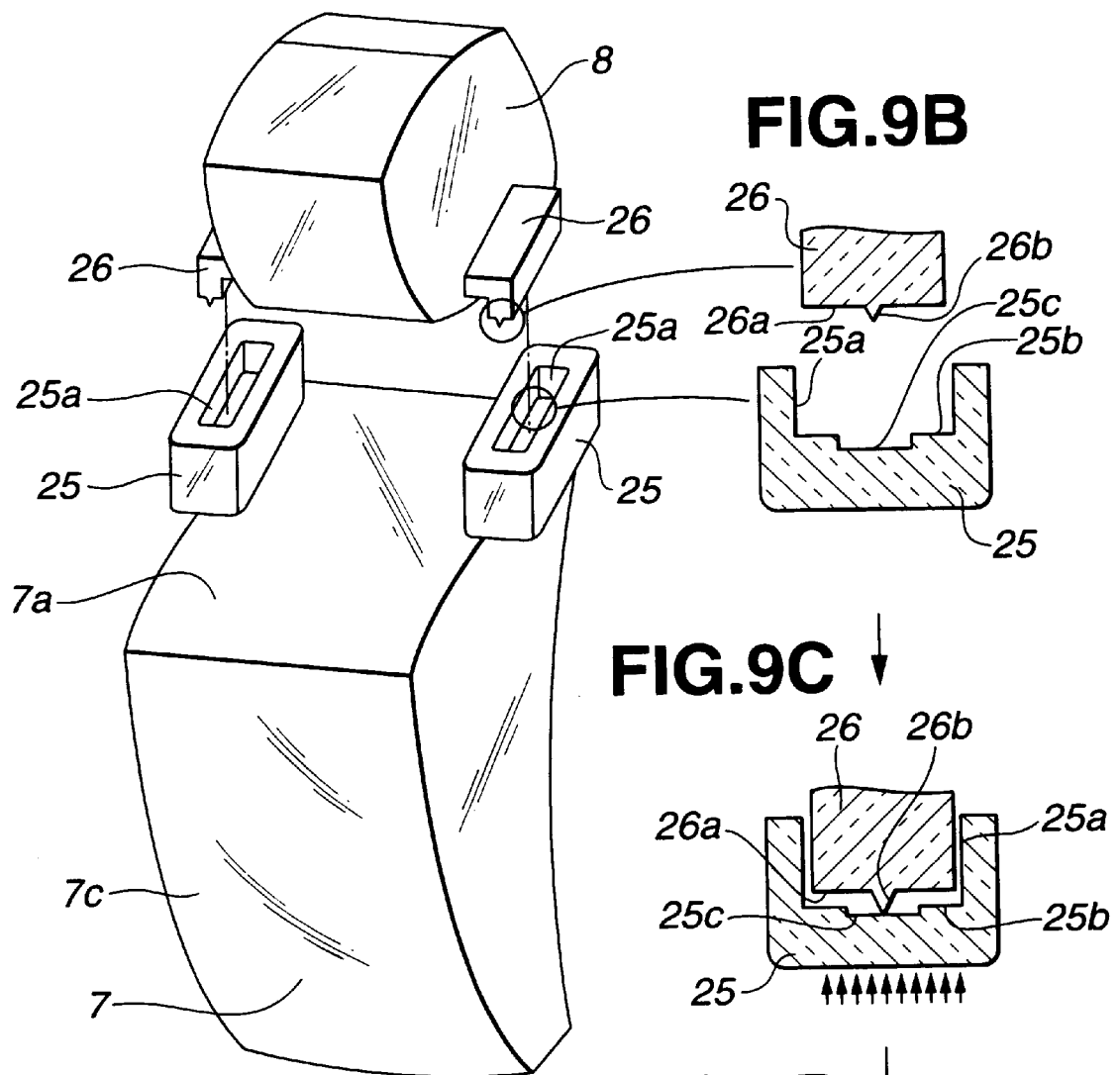

OPTICAL SYSTEM

This application claims benefit of Japanese Application No. Hei 11-137735 filed in Japan on May 18, 1999, the contents of which are incorporated by this reference.

BACKGROUND OF THE INVENTION

1. Field of the Invention

This invention relates to an optical system, more particularly to an optical system which leads images of a display element into eye balls of a viewer by way of a plurality of prisms.

2. Related Art Statement

Recently, head-mounting type video display devices which enable viewers to enjoy video and sound while mounting the devices on their heads have been commercialized. For example, the devices are mounted in a manner similar to mounting of glasses and the viewers can observe a large screen video.

In such a head-mounting type video display device, images are displayed by a small-sized LCD or the like and the images are enlarged by way of an optical system and are projected to eye balls of the viewer. Considering the mounting mode that the device is mounted on the head, efforts have been made so as to make the optical system have a compact constitution and a high performance.

As an example of such an optical system, Japanese Laid-Open Publication 333551/1995 discloses a viewing optical system formed of a single prism wherein images displayed by an LCD or the like are reflected on a plurality of reflection surfaces including a full reflection surface and a reflection surface formed of a curved surface having an optical power so as to lead images to eye balls of a viewer.

Further, Japanese Laid-Open Publication 73005/1997 discloses a technique which protrudes positioning portions from, for example, both side faces of a prism element having a plurality of reflection surfaces and the prism element is accurately positioned and fixedly secured to other member by means of shaped portions formed on these positioning portions. The publication also discloses a technique where a second optical element which transmits an outside scenery to eye balls of a viewer is combined with a first optical element which leads images displayed by display means such as an LCD or the like into the eye balls of the viewer.

With respect to devices disclosed in the above-mentioned Japanese Laid-Open Publication 333551/1995 and Japanese Laid-Open Publication 73005/1997, the optical element which leads the images displayed by the display element such as the LCD or the like is formed of a single prism. However, recently, high pixels and high definition of the display element have been requested. To realize such a display element having such a high definition, the use of the optical system which leads images to eye balls of the viewer only with the single prism is not necessarily optimal and hence, there arises a necessity to take into account an optical system constituted by combining a plurality of prisms. In this case, the relative positional relationship between these prisms must be determined with a high precision and hence, the realization of a technique which satisfies such a demand is requested.

OBJECTS AND SUMMARY OF THE INVENTION

It is an object of this invention to provide an optical system which can position a plurality of prisms with a high accuracy.

To summarize this invention, the optical system of this invention is an optical system which forms images on an eye ball of a viewer such that the viewer can observe images of a display element and includes a first prism which has first connecting portions and allows light beams from the display element to pass therethrough and a second prism which has second connecting portions and allows beams projected from the first prism to pass therethrough, and the first connecting portions and the second connecting portions are joined and aligned or registered with each other by way of joining portions formed on a mirror frame which fixedly secures the display element thereto.

Further, this invention is directed to an optical system which forms images on an eye ball of a viewer such that the viewer can observe images of a display element, wherein the optical system includes a first prism which has first connecting portions and allows light beams from the display element to pass therethrough and a second prism which has second connecting portions and allows beams projected from the first prism to pass therethrough, and the first prism and the second prism are aligned or registered with each other by joining the first connecting portions and the second connecting portions.

Further, this invention is directed to an optical system which forms images on an eye ball of a viewer such that the viewer can observe images of a display element, wherein the optical system includes a first prism which allows light beams from the display element to pass therethrough and a second prism which allows beams projected from the first prism to pass therethrough, and the first prism and the second prism are formed by an integral molding by, way of the connecting portions.

Further, this invention is directed to an optical system which enables an observation by superposing images of a display element and images of an outer field, wherein an image forming optical system is constituted by having a plurality of surfaces which reflect light, and includes a prism which has at least a portion of at least one surface out of a plurality of these surfaces formed of a half mirror (semi-transparent mirror) surface and an optical member for observing the images of the outer field which is formed on the half mirror surface by a composite molding.

Further, this invention is directed to an optical system which forms images such that images of a display element can be observed, wherein the optical system includes a first prism which has a projection surface through which incident light beams from the display element are projected after passing through the inside of the first prism, a second prism which includes an incidence surface through which light beams projected from the first prism enters, and connecting portions which connect the first prism and the second prism such that the first prism and the second prism are arranged with a given positional relationship.

These objects and advantages of this invention will become further apparent from the following detailed explanation.

BRIEF DESCRIPTION OF THE DRAWINGS

FIG. 9A, FIG. 9B, FIG. 9C and FIG. 9D are an exploded perspective view and essential part cross-sectional views showing a fourth example of the optical system of the above-mentioned embodiment.

DETAILED DESCRIPTION OF THE PREFERRED EMBODIMENT

Embodiment of this invention is explained hereinafter in conjunction with attached drawings.

Figure 1:
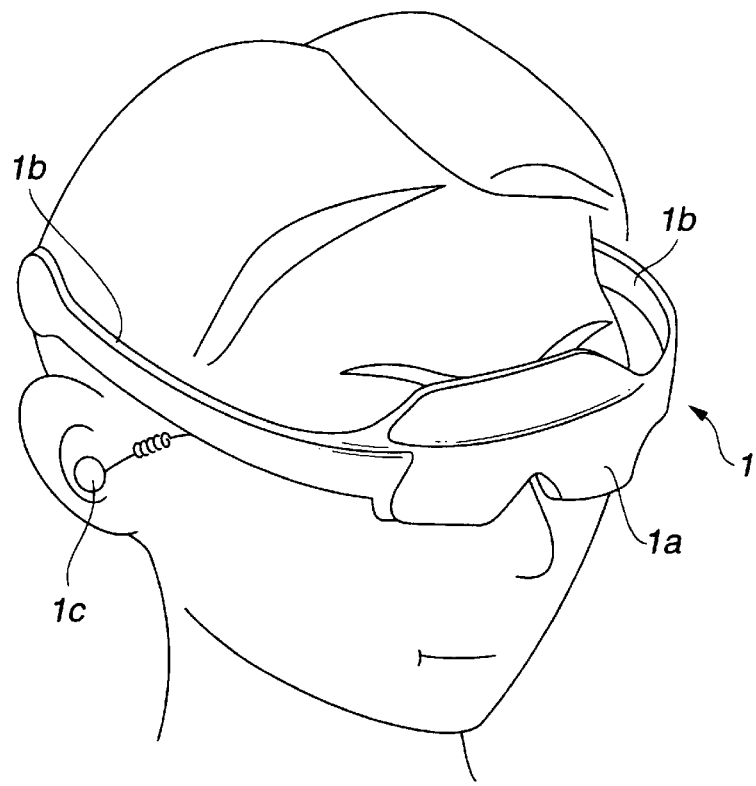
FIG. 1 is a perspective view showing a condition of a binocular glasses type display at the time of use thereof to which an optical system of one embodiment of this invention is applied.

FIG. 1 to FIG. 23D show the embodiment of this invention, wherein FIG. 1 is a perspective view showing a condition of a binocular glasses type display 1 to which an optical system is applicable at the time of use of the binocular glasses.

This binocular glasses type display 1 which constitutes an example of a head mounting type video display device is a device which a viewer uses in such a manner that the display 1 is fitted from the before his eyes to his temporal regions substantially in the same manner as ordinary glasses. Temporal region holding arms 1b which form temples of glasses are respectively protruded from both sides of a main body 1a which incorporates a pair of left and right optical systems, a video display circuit and the like. Further, with the use of the binocular glasses type display 1, by fitting ear phones 1c in ears, the viewer also can enjoy sound.

Figure 2:
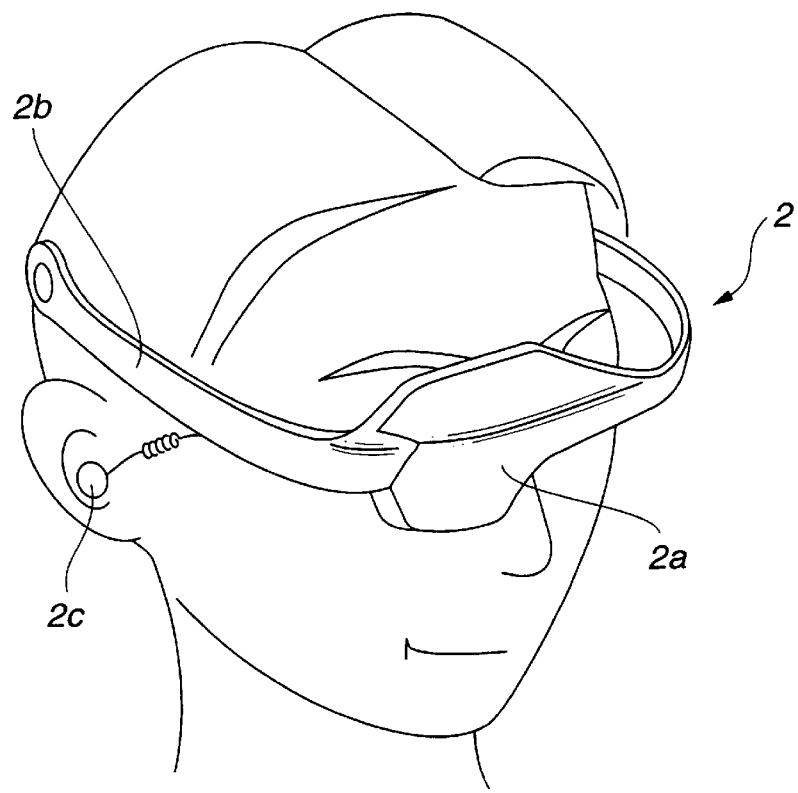
FIG. 2 is a perspective view showing a condition of a monocular glasses type display at the time of use thereof to which an optical system of one embodiment of this invention is applied.

Further, FIG. 2 is a perspective view showing a condition of a monocular glasses type display 2 at the time of use thereof to which an optical system is applicable.

The monocular glasses type display 2 shown in FIG. 2 which constitutes other example of the head mounting type video display device is a type which allows a viewer to see video with his right eye. Except for a point that the viewer can assure a normal field of vision with his left eye, the display 2 has substantially the same constitution as that of the display 1 shown in FIG. 1. That is, temporal region holding arms 2b are respectively protruded from both sides of a main body 2a and a viewer can listen to sound by means of ear phones 2c.

Although the display 2 for viewing with right eye is shown, it is needless to say that a display for viewing with left eye can be used.

Figure 3:
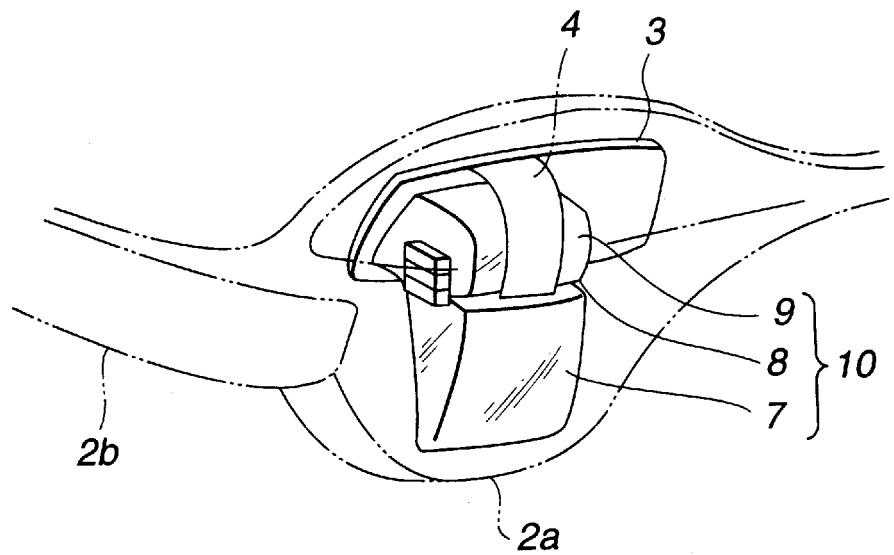
FIG. 3 is a perspective view showing the inner constitution of the glasses type display according to the above-mentioned embodiment.

Then, FIG. 3 is a perspective view showing the inner constitution of the glasses type display shown in FIG. 1 and FIG. 2. Here, an example of the inside of the display shown in FIG. 2 is shown, for example.

In the inside of the main body 2a, an electronic component mounted board 3 which receives video signals outputted from a video source such as a TV tuner, a DVD player or the like and generates drive signals for driving a display element, a flexible printed board 4 which is connected to the electronic component mounted board 3, the display element mounted on the flexible printed board 4, and a mirror frame unit 10 which leads images displayed by the display element to the eye ball of the viewer are disposed.

The mirror frame unit 10 includes a first prism 8 which leads images displayed by the display element, a second prism 7 which is disposed with a given positional relationship relative to the first prism 8 such that a light flux of images projected from the first prism 8 is led to the eye ball of the viewer after being reflected plural times therein, and a mirror frame 9 which fixedly secures the display element and fixedly secures the first prism 8 and the second prism 7 to the main body 2a while maintaining the given positional relationship between them.

Figure 4:
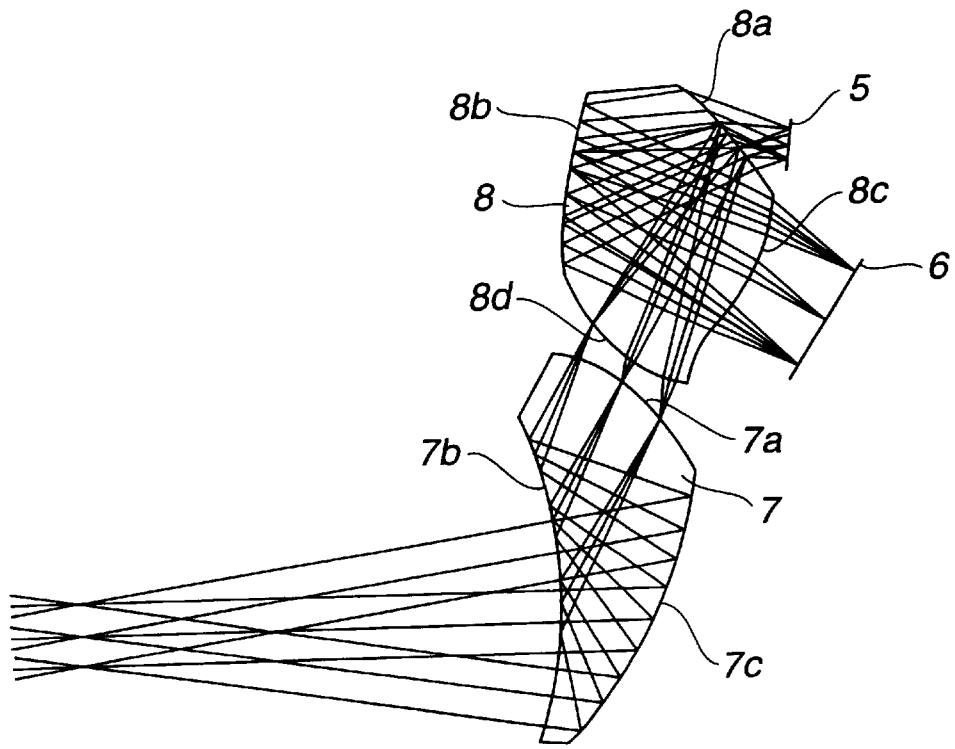
FIG. 4 is a side view showing a condition where light beams of image irradiated from a display element pass through a first prism and a second prism in the above-mentioned embodiment.

FIG. 4 is a side view showing a condition where light beams of images irradiated from the display element pass through the insides of the first prism 8 and the second prism 7.

The display element includes a LED unit 5 which time-sequentially performs emitting lights composed of three primary colors, that is, red (R), green (G) and blue (B) and a reflection type LCD 6 which receives light emitted from the LED unit 5 and reflects them at give reflection factors which are controlled in response to respective pixels.

That is, the light which is emitted from LEDs in the inside of the LED unit 5 and is uniformly diffused enters the first prism 8 through an incidence and reflection surface 8a and then is reflected on a first reflection surface 8b and illuminates the LCD 6 through a transmitting surface 8c.

The LCD 6 is designed so as to control the reflection factors of respective pixels in response to the color of the lighting light out of the above-mentioned R, G, B and constitutes a surface sequential display element in cooperation with the LED unit 5.

The light reflected on the LCD 6 again enters through the transmitting surface 8c and then, after the light is reflected on the first reflection surface 8b, the light is reflected on the inner surface side of the incidence and reflection surface 8a and then: is projected to the outside of the first prism 8 through the projection surface 8d.

The light projected from the first prism 8 to a space defined between prisms 8, 7 once forms images on an optical image plane and subsequently enters the second prism 7 through an incidence surface 7a and is reflected on the inner surface side of a reflection and projection surface 7b. Then, after being reflected on a second reflection surface 7c, the light is projected through the reflection and projection surface 7b and forms images on the eye ball of the viewer.

In this manner, by lighting the reflection type LCD 6 by the LED unit 5 in a surface sequential manner, images which is approximately three times as high as a conventional LCD which uses color filters or the like in definition can be obtained with the same number of pixels.

That is, to realize the images having such a high definition, and further, to enable the viewer to observe a wider screen, this embodiment adopts the optical system which is constituted by two prisms.

In this embodiment, to accurately form images having such a high definition on the eye ball of the viewer, the prisms are positioned with a high accuracy with the use of means which will be explained hereinafter.

Figure 5:
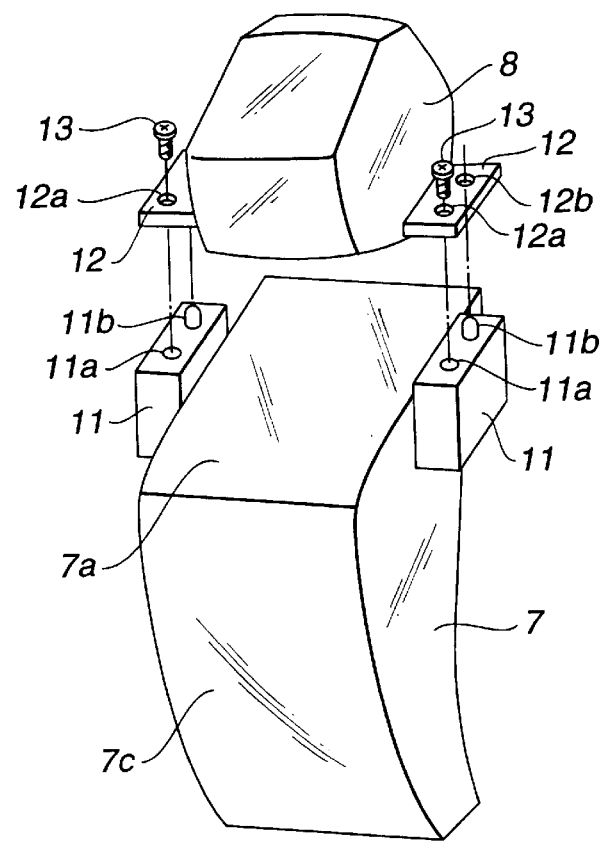
FIG. 5 is an exploded perspective view showing a first example of the optical system of the above-mentioned embodiment.

FIG. 5 is an exploded perspective view showing a first example of the optical system and shows the constitution where the first prism 8 and the second prism 7 are assembled with each other by positioning the first prism 8 and the second prism 7.

On left and right side surfaces which are disposed at the outside of the incidence surface 7a of the second prism 7, positioning and connecting portions 11 which constitute second connecting portions are formed by integrally molding with the second prism 7. The upper surfaces of the positioning and connecting portions 11 are protruded toward the first prism 8 than the incidence surface 7a so as to assure a distance between the first prism 8 and the second prism 7. Further, the upper surfaces of the positioning and connecting portions 11 are provided with small bolt holes 11a which constitute fastening holes and positioning pins 11b which constitute positioning protrusions.

On both left and right sides which are disposed at the outside of the projection surface 8d (see FIG. 4) of the first prism 8, positioning and connecting portions 12 which constitute first connecting portions and correspond to the above-mentioned positioning and connecting portion 11 are formed by an integral molding. Since the first prism 8 is made smaller than the second prism 7, the positioning and connecting portions 12 are slightly extended in left and right directions. In these positioning and connecting portions 12, positioning pin fitting openings 12b which constitute positioning holes are formed at positions corresponding to the above-mentioned positioning pins 11b and small bolt holes 12a which constitute fastening holes are formed at positions corresponding to small bolt holes 11a.

Due to such a constitution, in integrally connecting the first prism 8 and the second prism 7, first of all, the positioning pins 11b are fitted into the positioning pin fitting holes 12b, and then the lower surfaces of the positioning and connecting portions 12 and the upper surfaces of the positioning and connecting portions 11 are brought into contact with each other. Thereafter, small bolts 13 which constitute fastening members pass through the small bolt holes 12a and are threaded into the small bolt holes 11a so as to integrally connect the first prism 8 and the second prism 7.

In this manner, by providing the protrusions and the recesses for positioning the first prism 8 and the second prism 7 on the positioning and connecting portions 12 of the first prism 8 and the positioning and connecting portions 11 of the second prism 7, the positioning at the time of assembling becomes easy and, further, since the positioning and connecting portions 11 and the positioning and connecting portions 12 are fastened by means of the small bolts 13, the fastening operation is also facilitated.

Figure 7:
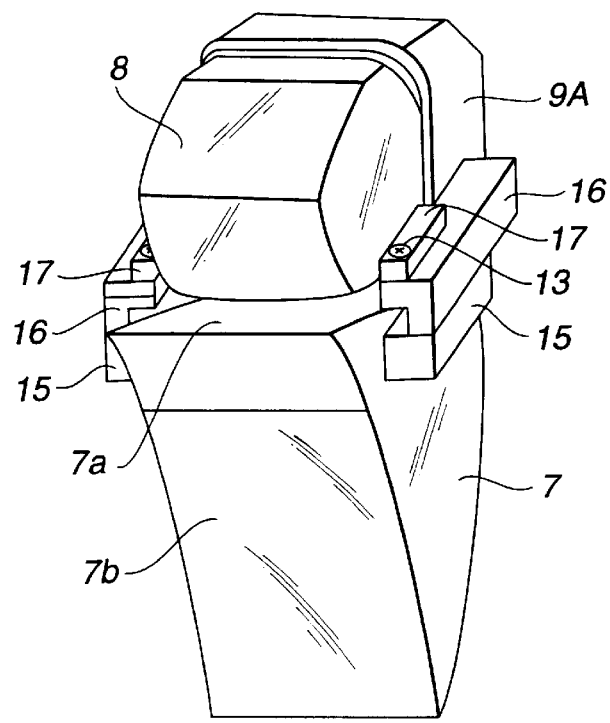
FIG. 7 is a perspective view showing an assembled condition of the second example of the optical system of the above-mentioned embodiment.
Figure 6:
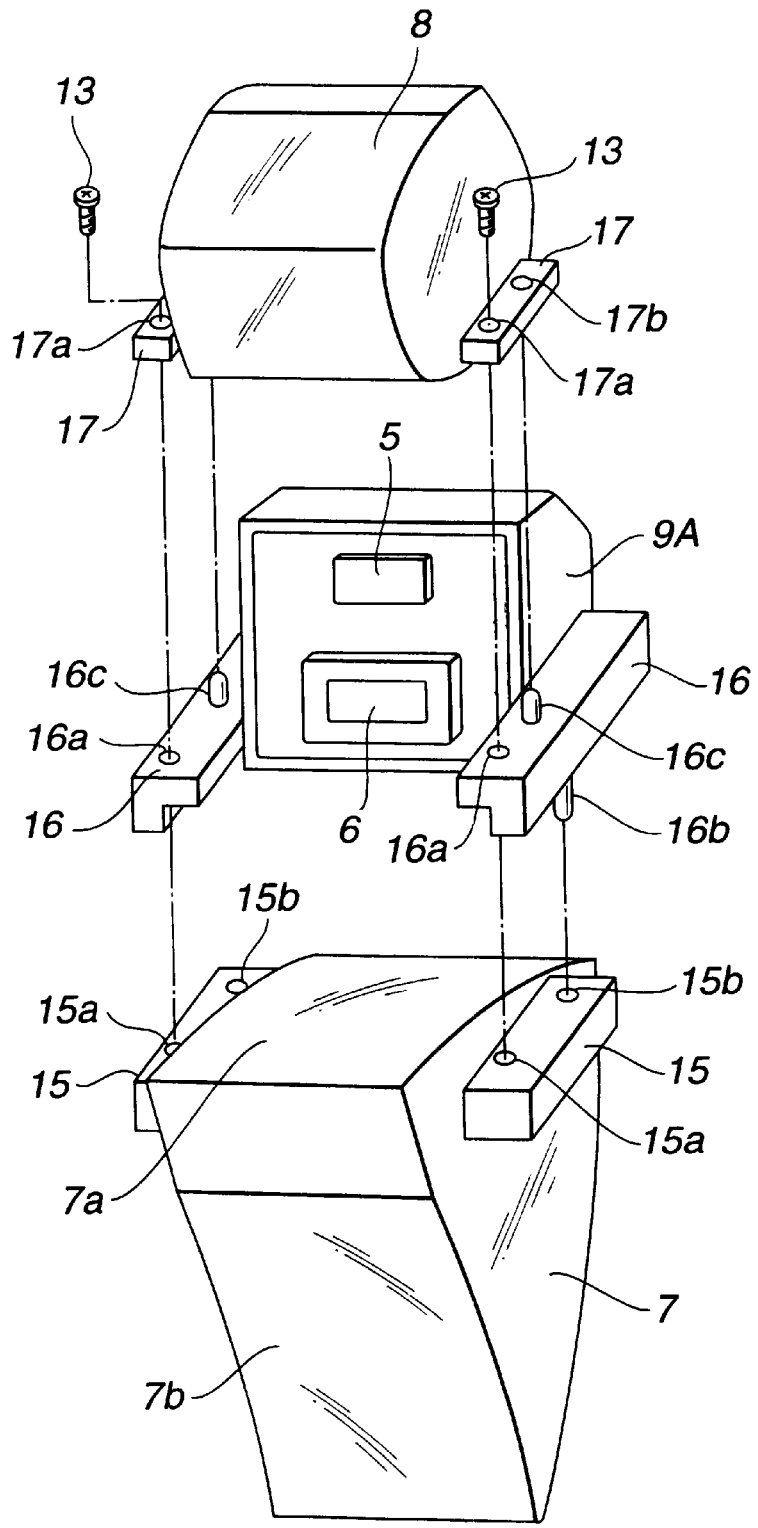
FIG. 6 is an exploded perspective view showing a second example of the optical system of the above-mentioned embodiment.

FIG. 6 is an exploded perspective view which shows a second example of the optical system and FIG. 7 is a perspective view which shows the second example of the optical system in the assembled condition, wherein these drawings show a constitution which enables assembling of the first prism 8, the second prism 7 and a mirror frame 9A while positioning them.

On both left and right side surfaces which are disposed at the outside of the incidence surface 7a of the second prism 7, positioning and connecting portions 15 which constitute second connecting portions are formed by an integral molding. Different from the example shown in FIG. 5, upper surfaces of these positioning and connecting portions 15 are disposed at positions lower than the incidence surface 7a, that is, away from the first prism 8. Further, in the upper surfaces of the positioning and connecting portions 15, small bolt holes 15a which constitute fastening holes and pin fitting holes 15b which constitute positioning holes are formed.

The mirror frame 9A which is provided with the above-mentioned LED unit 5 and the LCD 6 is designed to be fixedly secured to the upper portion of the second prism 7 and hence, the positioning and connecting portions 16 having an approximately L-shaped cross section which constitute joining portions are extended from both left and right sides of the second prism 7.

Small bolts 16a which constitute fastening holes are formed in the positioning and connecting portions 16 at positions corresponding to the small bolt holes 15a. On the other hand, positioning pins 16b which constitute positioning protrusions and are protruded downwardly are mounted on the lower surfaces of the positioning and connecting portions 16 at positions which correspond to the positioning pin fitting holes 15b, while positioning pins 16c which constitute positioning protrusions are protruded upwardly from the upper surface of the positioning and connecting portion 16.

Further, on both left and right sides which are disposed at the outside of a projection surface 8d (see FIG. 4) of the first prism 8, positioning and connecting portions 17 which correspond to the above-mentioned positioning and connecting portions 16 and constitutes first connecting portions are respectively formed. Since the difference in size between the first prism 8 and the second prism 7 is designed to be adjusted by means of the positioning and connecting portions 16 which have the above-mentioned L-shaped cross section, different from the example shown in FIG. 5, the positioning and connecting portions 17 are formed such that they do not extend excessively in the left and right directions.

Small bolt holes 17a which constitute fastening holes are formed in the positioning and connecting portions 17 at positions which correspond to the small bolt holes 15a and the small bolt holes 16a, while positioning pin fitting holes 17b which constitute positioning holes are formed in the positioning and connecting portions 17 at positions which correspond to the positioning pins 16c.

Due to such a constitution, at the time of integrally connecting the first prism 8, the second prism 7 and the mirror frame 9A, first of all, the positioning pins 16b are fitted into the positioning pin fitting holes 15b and then the positioning pins 16c are fitted into positioning pin fitting holes 17b, and finally, small bolts 13 pass through the small bolt holes 17a and the small bolt holes 16a and are threaded into small bolt holes 15a thus integrally connecting the first prism 8, the second prism 7 and the mirror frame 9A.

In this manner, according to the example shown in FIG. 6 and FIG. 7, the first prism 8 and the second prism 7 are mounted on the mirror frame 9A while sandwiching the positioning and connecting portions 16 of the mirror frame 9A and the difference in size between these prisms is adjusted by the shape of the positioning and connecting portions 16.

Due to such a constitution, the mirror frame can be also positioned and fixedly secured with a high accuracy and hence, the positioning of the first prism 8, the second prism 7, the LED unit 5 and the LCD 6 can be performed with a high accuracy and the operability is enhanced.

Figure 8A:
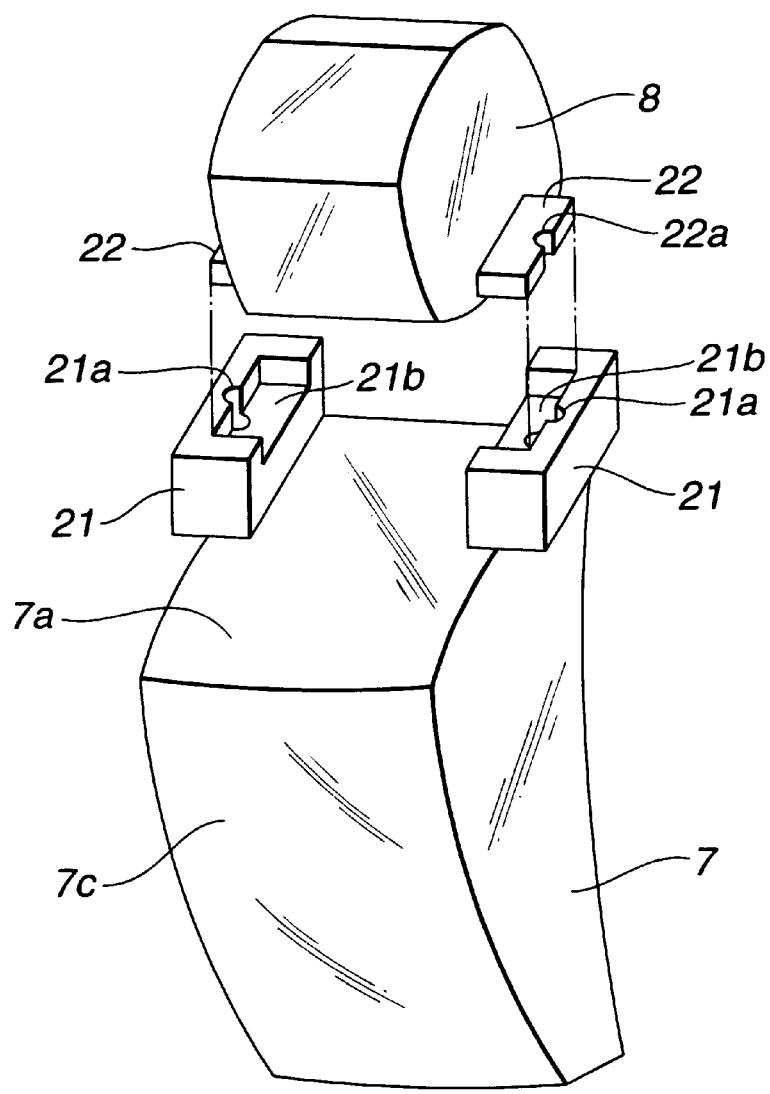
FIG. 8A and FIG. 8B are an exploded perspective view and an essential part cross-sectional view of a third example of the optical system of the above-mentioned embodiment.
Figure 8B:
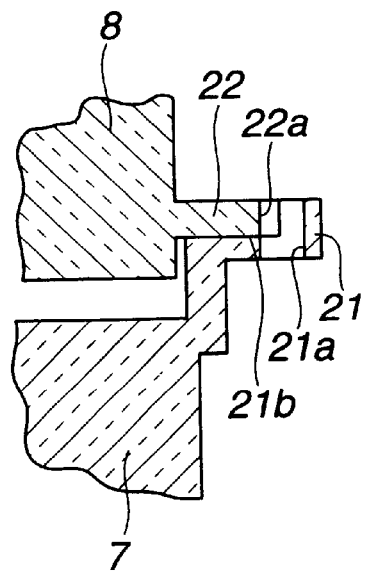

FIG. 8A and FIG. 8B are an exploded perspective view and an essential part cross-sectional view which show a third example of the optical system, wherein these drawings show a constitution which enables assembling of the first prism 8 and the second prism 7 with each other while positioning them.

As shown in FIG. 8A, on the incidence surface 7a of the second prism 7, positioning and connecting portions 21 which constitute the second connecting portions are formed by an integral molding such that they slightly extend from both left and right sides of the second prism 2. Recessed portions 21b which open inwardly and upwardly are formed in these positioning and connecting portions 21. Since bottom surfaces of these recessed portions 21b have steps relative to the incidence surface 7a, the recessed portions 21b function as a spacer between the first prism 8 and the second prism 7.

In central portions of the longitudinal-side side walls of these recessed portions 21b, small bolt holes 21a which constitute fastening holes are formed by cutting portions of the side walls.

Further, on both left and right sides which are disposed at the outside of the projection surface 8d (see FIG. 4) of the first prism 8, positioning and connecting portions 22 which correspond to the positioning and connecting portion 21 and constitute the first connecting portion are respectively formed. Approximately semi-circular small bolt notches 22a are formed in these positioning and connecting portions 22 at positions which correspond to the small bolt holes 21a.

In such a constitution, at the time of integrally connecting the first prism 8 and the second prism 7, first of all, the positioning and connecting portions 22 are fitted into the recessed portions 21b and then, as shown in FIG. 8B, the small bolts are threaded into positioning holes which are constituted by combining the small holes 21a and the small bolt notches 22a.

In this case, since the outside end surfaces of the positioning and connecting portions 22 and the left and right inner surfaces shown in FIG. 8A of the side walls of the positioning and connecting portions 21 are brought into contact with each other, the first prism 8 is positioned relative to the second prism 7 in the left and right directions, while since both longitudinal end surfaces of the positioning and connecting portions 22 and the front and rear inner side surfaces shown in FIG. 8A of the side walls of the positioning and connecting portions 21 are brought into contact with each other, the first prism 8 is positioned relative to the second prism 7 in the front and rear directions. Further, the first prism 8 is vertically positioned relative to the second prism 7 by the thicknesswise lower end surfaces of the positioning and connecting portion 22 and the bottom surfaces of the recessed portions 21b of the positioning and connecting portions 21. Further, the above-mentioned positioning in three directions is secured or maintained by fastening of small bolts.

FIG. 9A, FIG. 9B, FIG. 9C and FIG. 9D are an exploded perspective view and essential part cross-sectional views showing a fourth example of the optical system, wherein these drawings show a constitution which enables assembling of the first prism 8 and the second prism 7 with each other while positioning them.

As shown in FIG. 9A, on the incidence surface 7a of the second prism 7, positioning and connecting portions 25 which constitute the second connecting portions are formed respectively by an integral molding such that they slightly extend from both left and right sides of the second prism 2. As shown in FIG. 9B, recessed portions 25a which open upwardly are formed in these positioning and connecting portions 25. On bottom surfaces of these recessed portions 25a, positioning step portions 25b are formed and further welding recessed portions 25c which has surfaces slightly lower than the positioning step portions 25b are formed along the longitudinal direction of the recessed portions 25a.

Since the positioning step portions 25b define steps relative to the incidence surface 7a, the positioning step portions 25b function as a spacer between the first prism 8 and the second prism 7.

Further, on both left and right sides which are disposed at the outside of the projection surface 8d (see FIG. 4) of the first prism 8, positioning and connecting portions 26 which correspond to the positioning and connecting portion 25 and constitute the first connecting portions are respectively formed. These positioning and connecting portions 26 have an approximately L-shape and energy directors 26b for welding are protruded from lower surfaces 26a of the L-shaped portions.

Due to such a constitution, at the time of integrally connecting the first prism 8 and the second prism 7, as shown in FIG. 9C, first of all, L-shaped distal end portions of the positioning and connecting portions 26 are fitted into the recessed portions 25a, then the energy directors 26b and the welding recessed portions 25c are brought into contact with each other, and thereafter an ultrasonic vibration is applied so as to weld the energy directors 26b and the welding recessed portions 25c thus forming welded layers 26b' so as to integrally connect the first prism 8 and the second prism 7.

In this case, since the lower surface 26a of the L-shaped portions of the positioning and connecting portions 26 are brought into contact with the positioning step portions 25b, the first prism 8 and the second prism 7 are positioned relative to each other in the vertical direction.

Due to such a constitution, with the use of ultrasonic welding, the first prism 8 and the second prism 7 are firmly united with each other.

Figure 10:
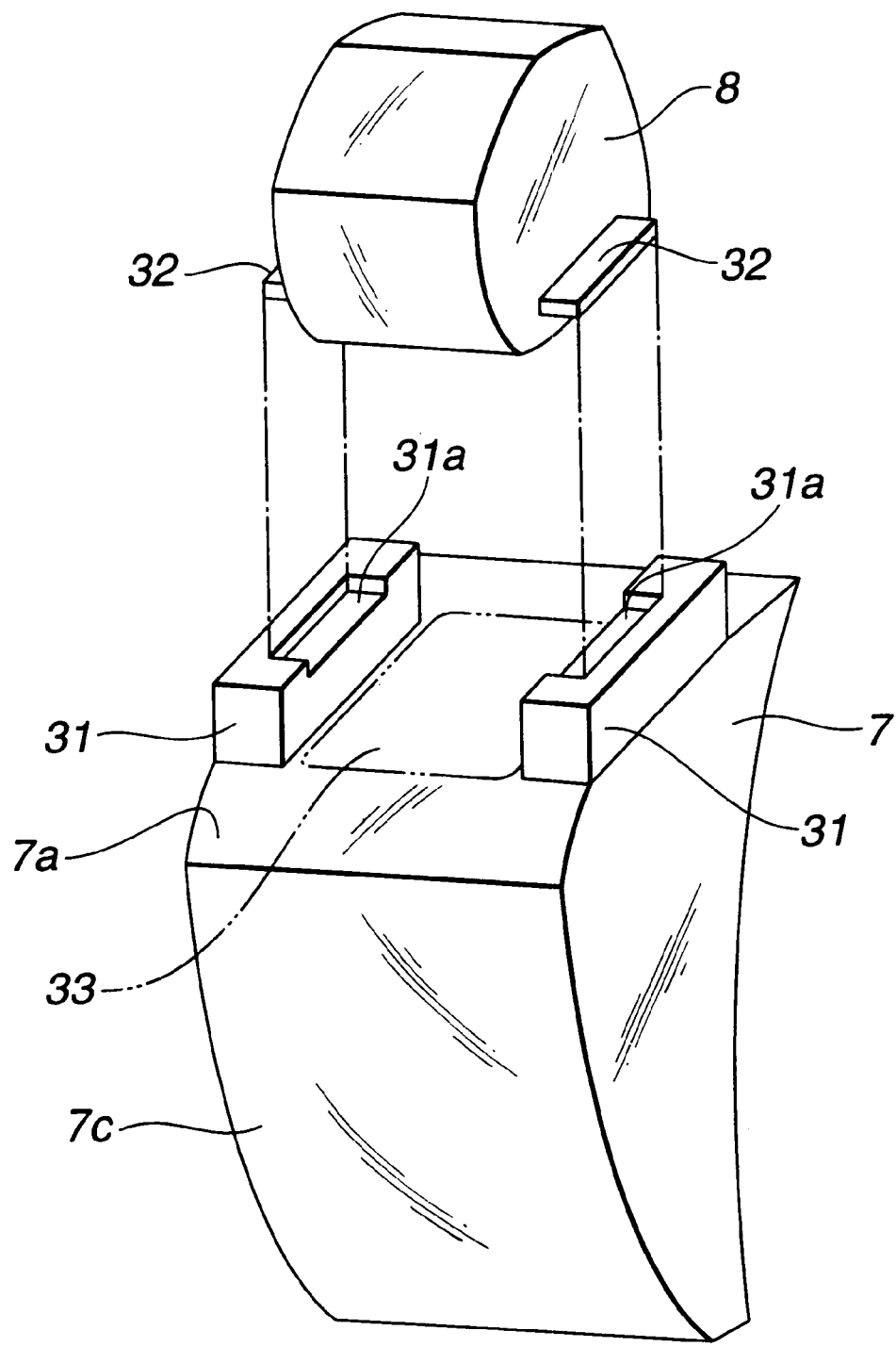
FIG. 10 is an exploded perspective view showing a fifth example of the optical system of the above-mentioned embodiment.

FIG. 10 is an exploded perspective view showing a fifth example of the optical system and shows a constitution which enables assembling of the first prism 8 and the second prism 7 while positioning them.

On the incidence surface 7a of the second prism 7, positioning and connecting portions 31 which constitute second connecting portions are respectively formed at left and right sides thereof by an integral molding. Positioning and connecting portions 31 are constituted such that they do not extend from the width of the prism 7. Further, it is needless to say that a pair of these positioning and connecting portions 31 are constituted such that their inner sides do not cover an effective passing range of flux of light projected from the first prism 8 to the second prism 7 (optical effective range 33).

Further, recessed portions 31a which open inwardly and upwardly are formed on the positioning and connecting portions 31 and bottoms surfaces of these recessed portions 31a are provided with steps relative to the incidence surface 7a and hence, the positioning and connecting portions 31 function as a spacer between the first prism 8 and the second prism 7.

On the other hand, on both left and right sides which are disposed at the outside of the projection surface 8d (see FIG. 4) of the first prism 8, positioning and connecting portions 32 which constitute first connecting portions and are fitted into the recessed portions 31a of the positioning and connecting portions 31 are respectively formed.

Due to such a constitution, at the time of integrally connecting the first prism 8 and the second prism 7, after fitting the positioning and connecting portions 32 into the recessed portions 31a, they may be fixedly secured to each other, for example, by an adhesive agent or may be fixedly secured by an ultrasonic welding or may be fixedly secured to each other by means of small bolts or the like.

In this manner, in the example shown in FIG. 10, both positioning and connecting portions 31 and 32 are formed such that both of them do not exceed the width of the second prism 7 which constitute the larger prism and hence, the optical system can be made compact.

Figure 11A:
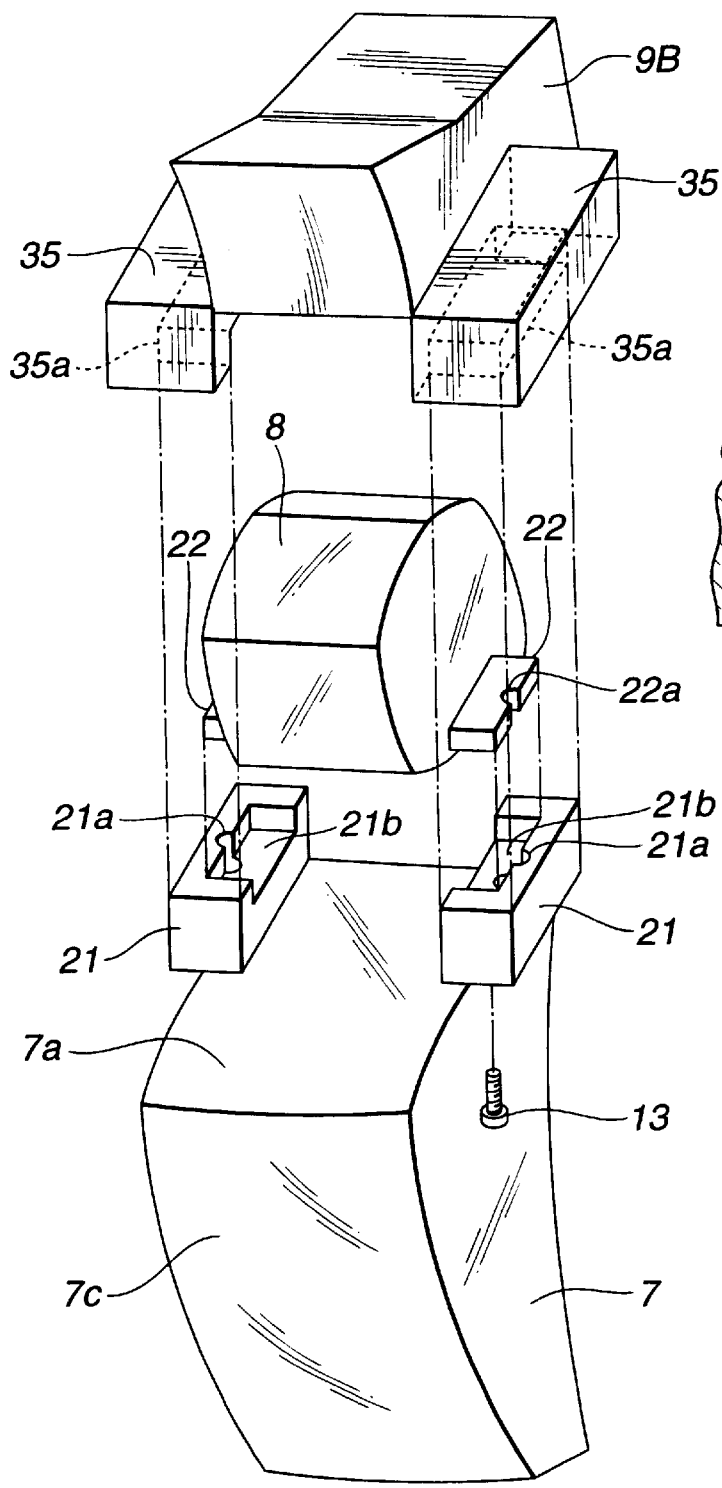
FIG. 11A and FIG. 11B are an exploded perspective view and an essential part cross-sectional view showing a sixth example of the optical system of the above-mentioned embodiment.
Figure 11B:
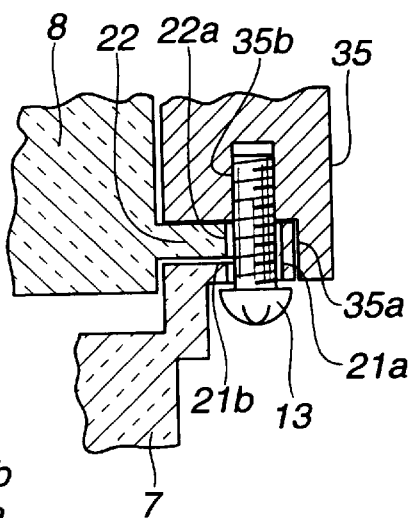

FIG. 11A and FIG. 11B are an exploded perspective view and an essential part cross-sectional view showing a sixth example of the optical system, wherein the constitution enables the assembling of the first prism 8, the second prism 7 and the mirror frame 9B each other while positioning them.

The positioning and connecting portions 21 formed on the second prism 7 and the positioning and connecting portions 22 formed on the first prism 8 which are shown in these FIG. 11A and FIG. 11B have the same constitution as those shown in FIG. 8A and FIG. 8B.

Further, as shown in FIG. 11A, the mirror frame 9B is designed such that the mirror frame 9B covers the first prism 8 which is mounted on the second prism 7 from above.

The mirror frame 9B is provided for fixedly mounting the LED unit 5 and the LCD 6 in the inside thereof as mentioned previously and positioning and connecting portions 35 which constitute joining portions are extended from both left and right sides of the mirror frame 9B.

Recessed portions 35a which open inwardly and downwardly are formed in these positioning and connecting portions 35 and, as shown in FIG. 11B, small bolt holes 35b which constitute fastening holes are formed in approximately central portions of the recessed portions 35a at positions which correspond to the small bolt holes 21a and the small bolt notches 22a.

In such a constitution, at the time of integrally connecting the first prism 8, the second prism 7 and the mirror frame 9B, first of all, the positioning and connecting portions 22 are fitted into the recessed portions 21b. Subsequently, the recessed portions 35a of the positioning and connecting portions 35 are fitted over the positioning and connecting portions 21 such that they cover these positioning and connecting portions 22 and the recessed portions 21b from above. Then, as shown in FIG. 11B, small bolts 13 are threaded into positioning holes constituted by combining the small bolt holes 21a, the small bolt notches 22a and the small bolt holes 35b.

Figure 12:
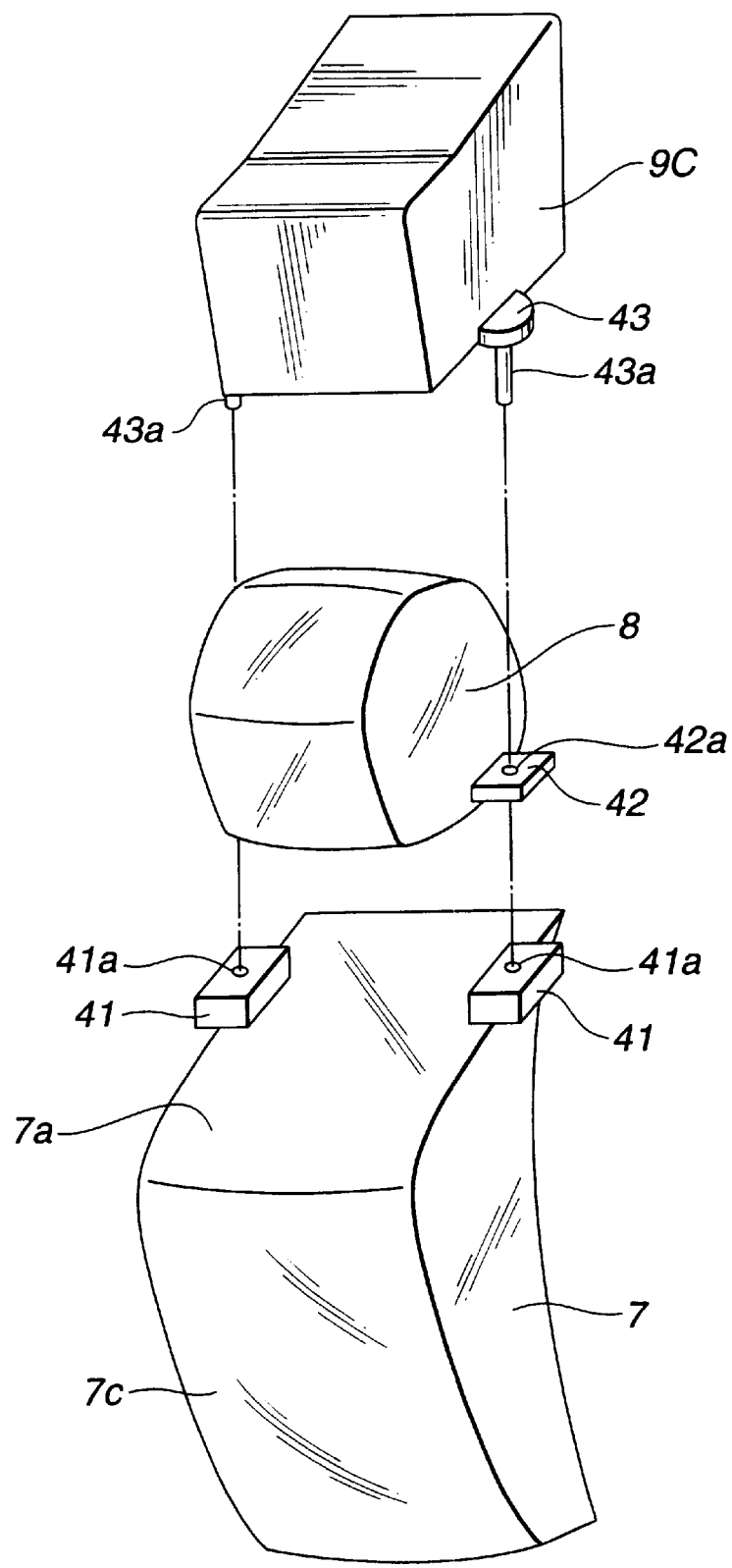
FIG. 12 is an exploded perspective view showing a seventh example of the optical system of the above-mentioned embodiment.

FIG. 12 is an exploded perspective view showing a seventh example of the optical system and shows a constitution which enables the assembling of the first prism 8, the second prism 7 and the mirror frame 9c each. other while positioning them.

On the incidence surface 7a of the second prism 7, positioning and connecting portions 41 which constitute the second connecting portions and slightly extend from both left and right sides of the incidence surface 7a are respectively formed by an integral molding. Positioning pin fitting holes 41a which constitute positioning holes are formed in these positioning and connecting portions 41.

The upper surfaces of the positioning and connecting portions 41 have steps relative to the above-mentioned incidence surface 7a and hence, the positioning and connecting portions 41 are designed such:that they function as spacers between the first prism 8 and the second prism 7.

On the other hand, on both left and right sides which are disposed at the outside of the projection surface 8d (see FIG. 4) of the first prism 8, positioning and connecting portions 42 which constitute the first connecting portions are formed at positions which correspond to the above-mentioned positioning and connecting portions 41. Also in these positioning and connecting portions 42, positioning pin fitting holes 42a which constitute the positioning holes are formed at positions which correspond to the above-mentioned positioning pin fitting holes 41a.

Further, positioning and connecting portions 43 which constitute joining portions are extended from both left and right sides of the mirror frame 9C and positioning pins 43a which constitute positioning protrusions are protruded downwardly from lower end surfaces of the positioning and connecting portions 43.

In such a constitution, at the time of integrally connecting the first prism 8, the second prism 7 and the mirror frame 9C, the positioning and connecting portions 41 and the positioning and connecting portions 42 are brought into contact with each other such that respective positions of the positioning fitting holes 41a and 42a are aligned and thereafter the mirror 9C covers and fits over the first prism 8 such that the positioning pins 43a pass through respective positioning pin fitting holes 41a and 42a in common. For fixedly securing the first prism 8, the second prism 7 and the mirror frame 9C, an adhesive agent, an ultrasonic welding or small bolts may be used in the same manner as the previous examples.

Figure 13A:
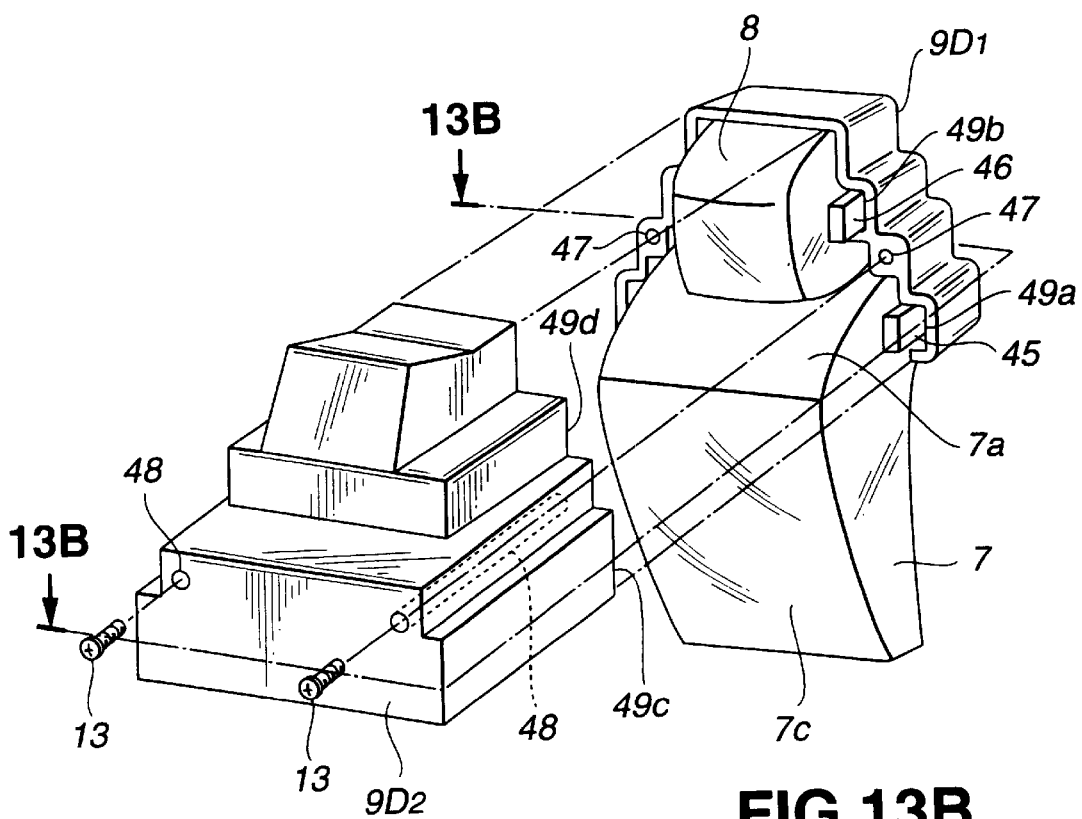
FIG. 13A and FIG. 13B are an exploded perspective view and a cross-sectional view taken along a line 13B—13B showing an eighth example of the optical system of the above-mentioned embodiment.
Figure 13B:
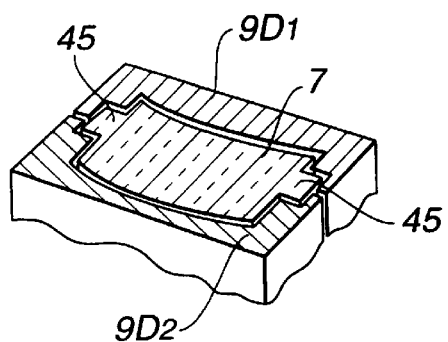

FIG. 13A and FIG. 13B are an exploded perspective view and a cross-sectional view taken along a line 13B—13B and show a constitution which enables the assembling of the first prism 8, the second prism 7 and a mirror frame 9D1 and 9D2 which has a two-split structure while positioning them.

As shown in FIG. 13A and FIG. 13B, positioning and connecting portions 45 which constitute the second connecting portions and perform positioning by fitting are protruded from both sides of the second prism 7. Similarly, positioning and connecting portions 46 which constitute the first connecting portions and perform positioning by fitting are protruded from both sides of the first prism 8.

The mirror frame shown in FIG. 13A and FIG. 13B is constituted by combining two members. That is, the mirror frame is constituted by joining the first mirror frame 9D1 and the second mirror frame 9D2.

In the first mirror frame 9D1, a space which accommodates an approximately half of the first prism 8 and a space which accommodates an approximately half of the upper portion of the second prism 7 are formed. The first mirror frame 9D1 is provided with fitting recessed portions 49a and 49b which constitute joining portions and into which the above-mentioned positioning and connecting portions 45 and 46 are fitted respectively. Further, small bolt holes 47 which constitute fastening holes are formed in the first mirror frame 9D1.

In the second mirror frame 9D2, a space which accommodates an approximately remaining half of the first prism 8 and a space which accommodates an approximately remaining half of the upper portion of the second prism 7 are formed. Similarly, the second mirror frame 9D2 is provided with fitting recessed portions 49c and 49d which constitute joining portions and into which the above-mentioned positioning and connecting portions 45 and 46 are fitted respectively. Further, small bolt holes 48 which constitute deep fastening holes are formed in the second mirror frame 9D2.

In such a constitution, at the time of integrally connecting the first prism 8, the second prism 7 and the mirror frames 9D1 and 9D2, for example, the first prism 8 and the second prism 7 are fell into the first mirror frame 9D1 which constitutes one frame member and the positioning and connecting portions 45 and 46 are fitted into the fitting recessed portions 49a and 49b. Subsequently, the second mirror frame 9D2 which constitutes the other frame member is made to cover the first prism 8 and the second prism 7 and the positioning and connecting portions 45 and 46 are fitted into the fitting recessed portions 49c and 49d. Further, the small bolts 13 are threaded into the small bolt holes 48 and the small bolt holes 47 which are aligned with each other.

Due to such a constitution, as shown in FIG. 13B, a clearance between the second prism 7 and the first mirror frame 9D1 and the second mirror frame 9D2 can be eliminated and hence the intrusion of foreign substances (dust, for example) from the outside can be prevented.

Figure 14:
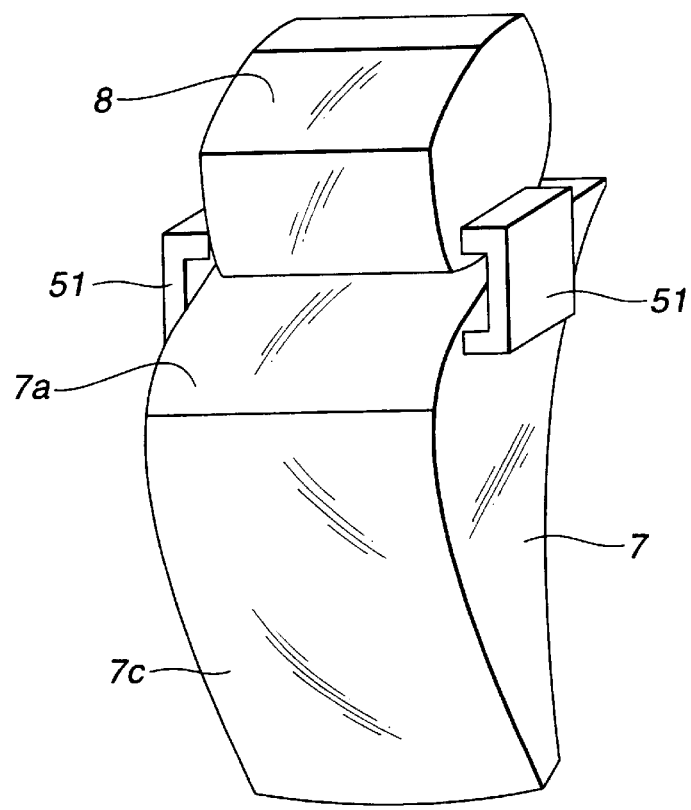
FIG. 14 is a perspective view of a ninth example of the optical system of the above-mentioned embodiment.
Figure 15:
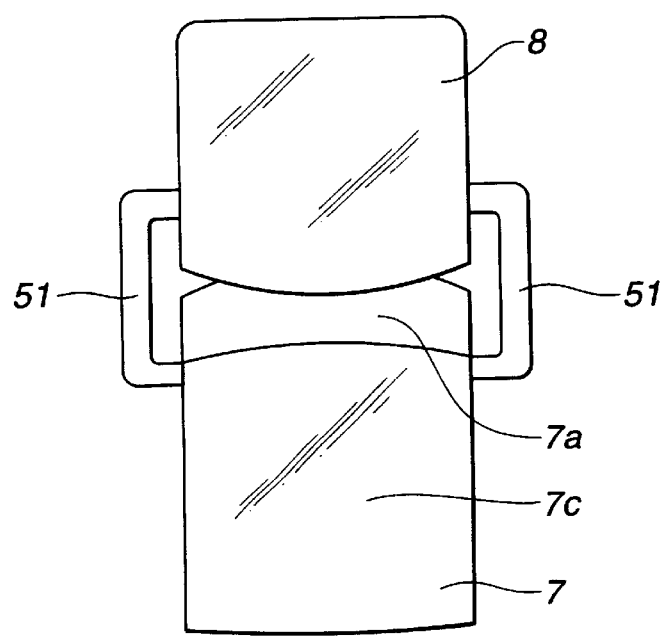
FIG. 15 is a front view of a ninth example of the optical system of the above-mentioned embodiment.
Figure 16:
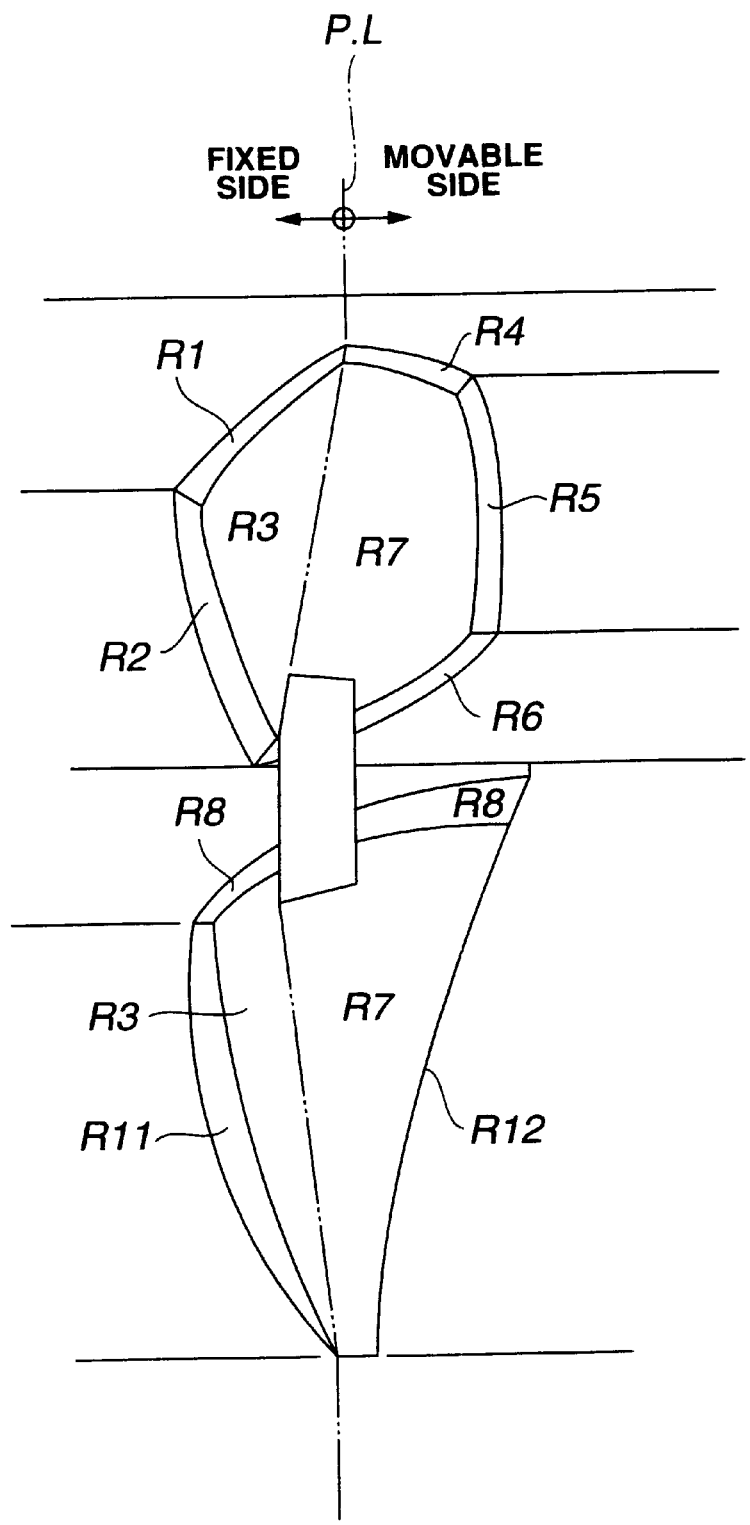
FIG. 16 is a side view showing a split mold of a ninth example of the optical system of the above-mentioned embodiment.

FIG. 14 is a perspective view showing a ninth example of the optical system, FIG. 15 is a front view showing a ninth example of the optical system, and FIG. 16 is a side view showing a split mold for the ninth example of the optical system.

The ninth example of the optical system is constituted by integrally molding the first prism 8 and the second prism 7 which are disposed away from each other with a given distance by means of the split mold.

That is, in this optical system, the first prism 8 and the second prism 7 are connected to each other by means of positioning and connecting portions 51, wherein the positioning and connecting portions 51 constitute left and right connecting portions having an approximately laterally opened U-shaped cross section and are integrally molded with the first prism 8 and the second prism 7.

Molding of this optical system is carried out as shown in FIG. 16.

That is, a mold for molding is split into a fixed side mold and a movable side mold and a border defined between them is a parting line P.L shown in FIG. 16 by a chain double-dashed line.

The fixed side mold and the movable side mold are respectively composed of a plurality of mold members for molding respective surfaces of the prisms. In the fixed side mold shown at the left side of the parting line P.L, the surfaces R1, R2, R3, R8 and R11 are formed by respectively different mold members. Although the surface R8 is shaped such that it extends toward the movable side, the extended portion is formed by one of the fixed side mold members.

Further, in the movable side mold shown at the right side of the parting line P.L, the surfaces R4, R5, R6, R7 and R12 are formed by respectively different mold members.

As shown in FIG. 15, the prisms 8, 7 are formed symmetrically in a left and right directions with respect to the central line and hence, respective surfaces on the side opposite to the side shown in FIG. 16 are formed by corresponding mold members in the same manner.

In this manner, by designing the shape of the prisms and the mold for molding, the first prism 8 and the second prism 7 can be integrally molded while maintaining the given positional relationship between them and hence, an operation to assemble the prisms each other becomes unnecessary so that the number of operational steps can be reduced and the productivity is enhanced.

Figure 17:
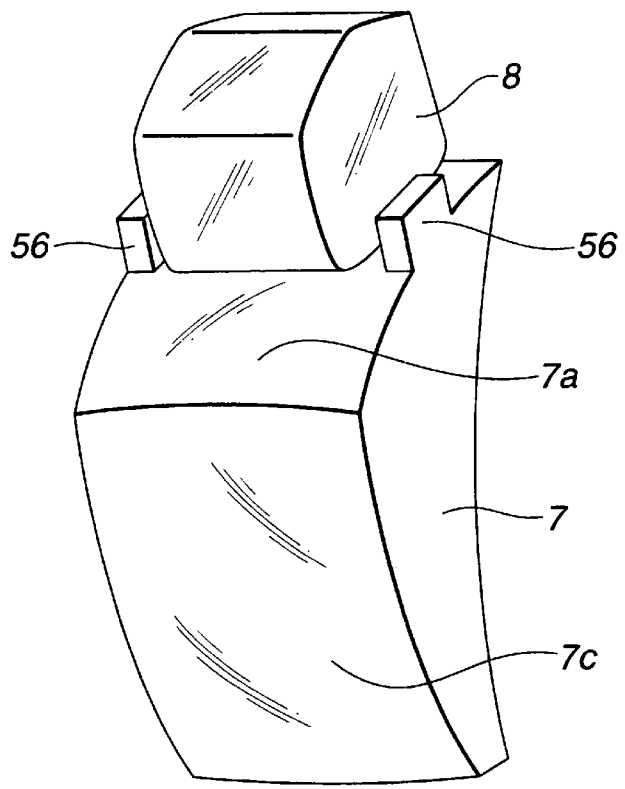
FIG. 17 is a perspective view of a tenth example of the optical system of the above-mentioned embodiment.
Figure 18:
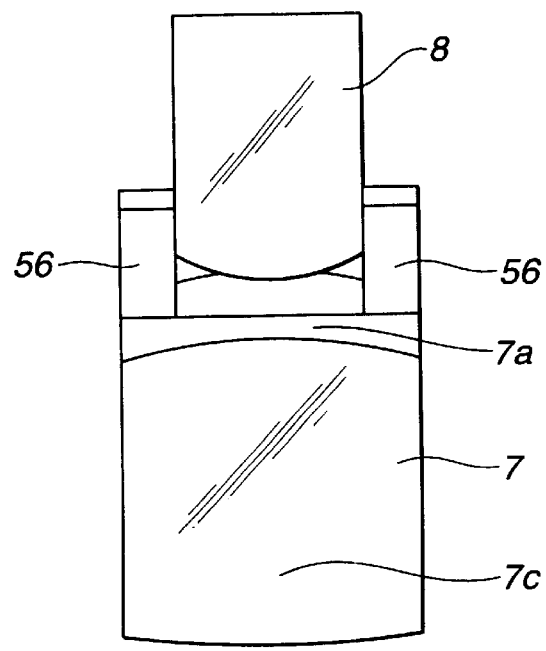
FIG. 18 is a front view of a tenth example of the optical system of the above-mentioned embodiment.
Figure 19:
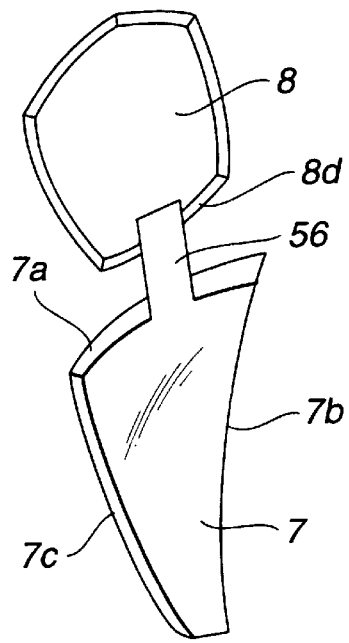
FIG. 19 is a side view of a tenth example of the optical system of the above-mentioned embodiment.

FIG. 17 is a perspective view showing a tenth example of the optical system, FIG. 18 is a front view showing the tenth example of the optical system and FIG. 19 is a side view showing the tenth example of the optical system.

The optical system of the tenth example also enables an integral molding of the first prism 8 and the second prism 7 which are arranged away from each other with a given distance by a split mold in the same manner as the ninth example of the optical system.

That is, in this optical system, the first prism 8 and the second prism 7 are also connected with each other by means of positioning and connecting portions 56 which constitute left and right connecting portions having an approximately rectangular parallelepiped shape and are integrally molded with the first prism 8 and the second prism 7.

Here, the difference between this example and the example shown in FIG. 14 to FIG. 16 lies in that the positioning and connecting portions 56 are formed such that they do not extend from or exceed the width of the second prism 7 which constitutes the larger prism.

Due to such a constitution, the optical system can be made compact and light-weighted.

Figure 20:
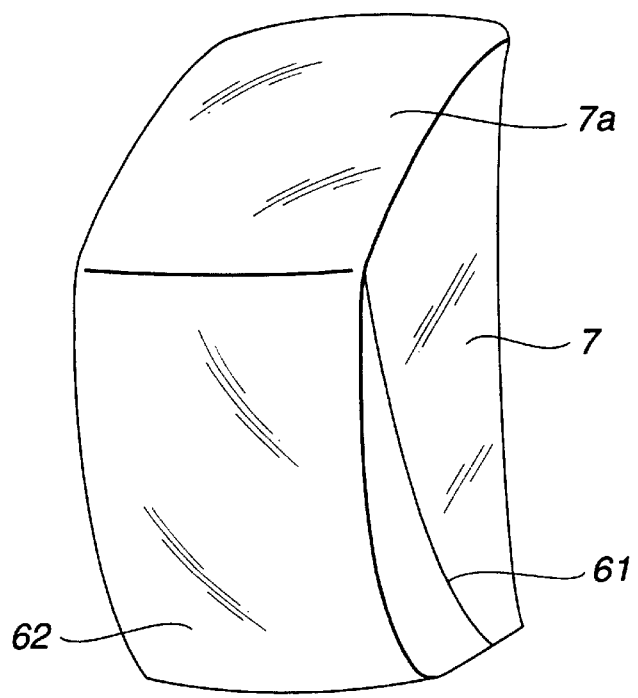
FIG. 20 is a perspective view showing a second prism which is constituted such that a see-through display is possible in the above-mentioned embodiment.
Figure 21:
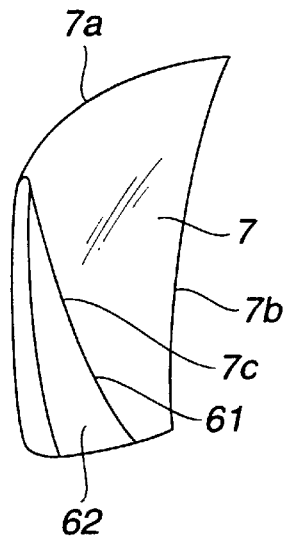
FIG. 21 is a side view showing a second prism which is constituted such that a see-through display of only an upper portion of the field of vision is possible in the above-mentioned embodiment.

FIG. 20 is a perspective view showing the second prism 7 which is constituted so as to enable a see-through display and FIG. 21 is a side view showing the second prism 7 which is constituted so as to enable a see-through display.

In applying the optical system to a head mounting type video display device, there may be a case which requires not only the observation of video transmitted from the video source but also the observation of the outside scenery. The second prism 7 shown in FIG. 20 and FIG. 21 show a constitution which satisfy such a demand.

That is, a half mirror surface or a semi-transparent mirror surface 61 is formed on the above-mentioned second reflection surface 7c of the second prism 7 by means of vapor deposition or the like, for example.

A transmitting optical system portion 62 which is formed of a UV (ultraviolet rays) curing resin which constitute an optical member, for example, is coated on the half mirror surface 61.

By forming the second reflection surface 7c as the half mirror surface 61, the viewer can observe video from the LCD 6 by reflection and can observe the outside scenery incident from the transmitting optical system portion 62 through the half mirror surface 61. In this case, the main body 1a is provided with a see through window (not shown in the drawings) which enables the observation of the outside scenery.

Unless the transmitting optical system portion 62 is provided, the external light incident through the half mirror surface 61 is refracted on the second prism 7. The transmitting optical system portion 62 is provided for allowing the external light substantially to pass through the second prism 7 as it is and to reach the eye ball of the viewer by overlapping the transmitting optical system portion 62 to the second prism 7.

Figure 22A:
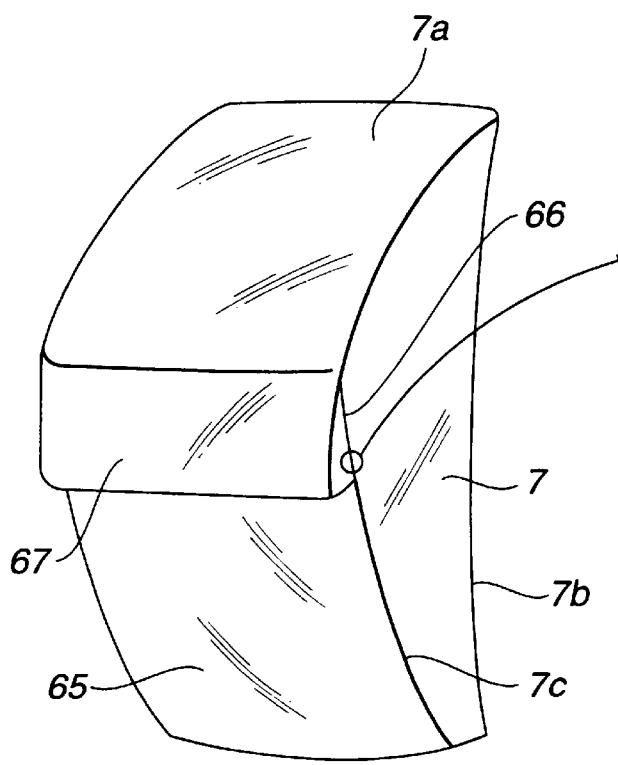
FIG. 22A and FIG. 22B are a perspective view and an essential part cross-sectional view of a second prism which is constituted such that a see-through display is possible in the above-mentioned embodiment.
Figure 22B:
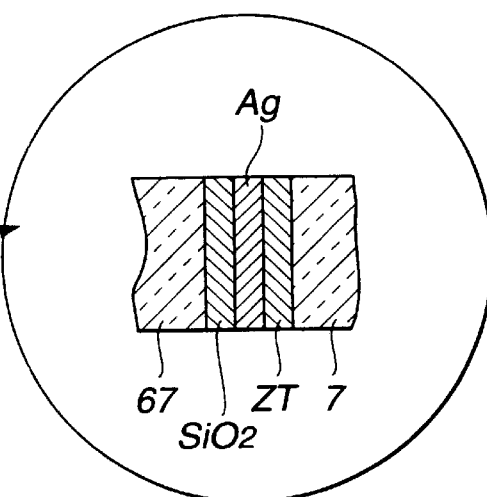

FIG. 22A and FIG. 22B are a perspective view and an essential part cross-sectional view showing the second prism 7 which is constituted such that only an upper portion of the field of vision is capable. of performing a see-through observation. FIG. 23A, FIG. 23B, FIG. 23C and FIG. 23D are views showing steps for manufacturing the second prism 7 shown in FIG. 22A and FIG. 22B.

As shown in FIG. 22A, on the second reflection surface 7c of the second prism 7, a half mirror surface 66 is formed at the upper portion while a normal reflection mirror surface 65 is formed at the remaining portion.

Further, a transmitting optical system portion 67 which is formed of a UV (ultraviolet rays) curing resin which constitutes an optical member, for example, is coated on the half mirror surface 66.

The half mirror surface 66 is constituted by a plural layered coating and has a laminated structure shown in FIG. 22B, for example.

That is, for example, a coating surface made of ZT which is a compound of zirconium oxide and tantalum pentoxide is formed on the second prism 7 formed of amorphous polyolefin and a coating surface made of silver Ag is formed on the coating surface of ZT by vapor deposition or the like.

Further, a coating surface made of silicon dioxide $SiO_2$ (or a coating surface made of tungsten trioxide $WO_3$) is formed on the coating surface of silver Ag. On the half mirror surface having such a condition, a transmitting optical system portion 67 made of a UV curing resin is formed.

The silicon dioxide $SiO_2$ has a favorable adhesion to the UV curing resin and hence, the transmitting optical system portion 67 can be assuredly formed by eliminating the peeling off, the defects, the falling or the like of the transmitting optical system portion 67.

Then, steps for forming the transmitting optical system portion 67 on the second prism 7 under the condition where the half mirror 66 is formed are explained in conjunction with FIG. 23A, FIG. 23B, FIG. 23C and FIG. 23D.

A mold 68 for forming the transmitting optical system portion 67 is formed of a material which allows ultraviolet rays pass therethrough. A recessed portion 68b which corresponds to the shape of the transmitting optical system portion 67 is formed on the mold 68 and one end portion 68a of the recessed portion 68b defines a position where the recessed portion 68b is aligned with the upper end portion of the second reflection surface 7c.

Further, a mounting curved surface 68c which is disposed close to the recessed portion 68b and is provided for mounting a normal reflection surface of the transmitting optical system portion 67 thereon hermetically is formed on the mold 68.

Still furthermore, an injection portion 68d for injecting a UV curing resin which is, for example, in a liquid form before curing is formed at one side portion of the recessed portion 68b.

Figure 23A:
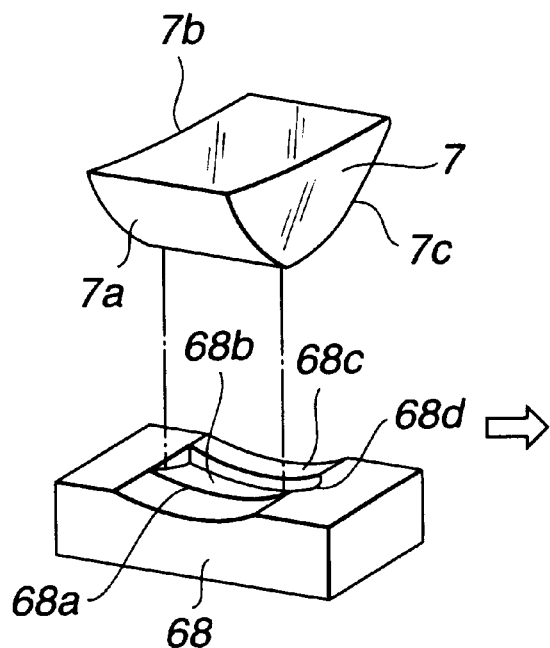
FIG. 23A, FIG. 23B, FIG. 23C and FIG. 23D are views showing steps for manufacturing the second prism shown in FIG. 22A and FIG. 22B.

In forming the transmitting optical system portion 67 with the use of such a mold 68, first of all, as shown in FIG. 23A, the upper end portion of the second reflection surface 7c is aligned with one end portion 68a of the mold 68, the second prism 7 is placed on th e mold 68, and further, the normal reflection surface of the transmitting optical system portion 67 is brought into a hermetic contact with the mounting curved surface 68c.

Figure 23B:
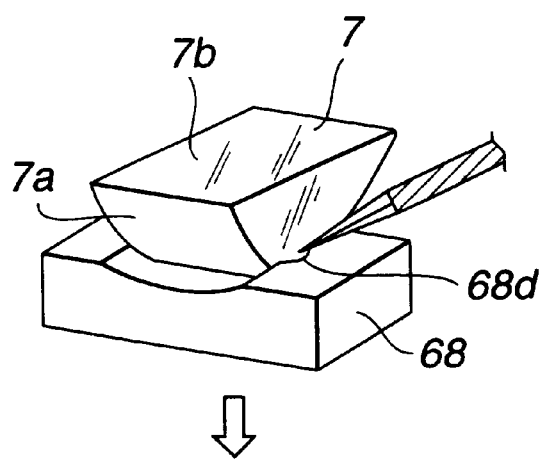
Figure 23D:
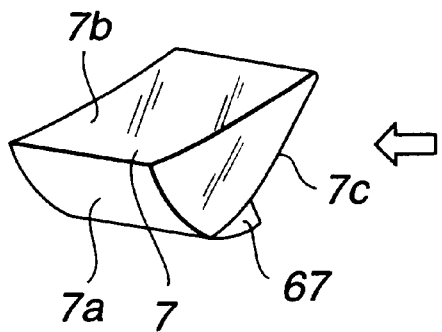
Figure 23C:
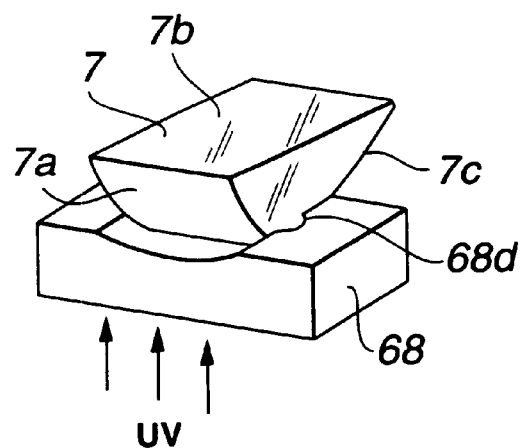

Subsequently, as shown in FIG. 23B, a given amount of UV curing resin in a liquid form is filled in through the above-mentioned injection portion 68d and, as shown in FIG. 23C, the ultraviolet rays are irradiated so as to harden the resin.

When, the resin is completely hardened, the second prism 7 is removed from the mold 68 and, as shown in FIG. 23D, the second prism 7 having the transmitting optical system portion 67 is completed.

In this manner, by making a portion of the field of vision, for example, only the upper portion of the second prism 7 have a constitution which allows the external light pass therethrough, the viewer can observe not only the video from the LCD but also the outer scenery substantially without lowering the visibility.

As has bee n explained heretofore, according to the present embodiment, in the optical system formed of a plurality of prisms, the prisms can be positioned with a high accuracy at a low cost and with the least operational steps.

In this invention, it is apparent that working modes different in a wide range can be formed on this basis of this invention without departing from the spirit and scope of the invention. This invention is not restricted by any specific embodiment except for being limited by the appended claims.

What is claimed is:

1. An optical system which forms images on an eyeball of a viewer such that the viewer can observe images of a display element including:
    a first prism which has a first connecting portion and allows light beams from said display element to pass therethrough, and
    a second prism which has a second connecting portion and allows light beams projected from the first prism to pass therethrough,
    wherein said first connecting portion and said second connecting portion are joined and positioned by way of joining portions formed on a display frame which fixedly secures said display element.

2. An optical system according to claim 1, wherein;
    said joining portions includes positioning protrusions which respectively correspond to said first connecting portions and said second connecting portions and fastening holes, said first connecting portions and said second connecting portions respectively include positioning holes which correspond to said positioning protrusions, and said first prism and said second prism are aligned with each other relative to said joining portions by inserting said positioning protrusions into these positioning holes, and said first connecting portions and said second connecting portions are fixedly secured to each other by threading fastening members into said fastening holes.

3. An optical system according to claim 1, wherein;

said mirror frame includes recessed portions which correspond to said first connecting portions and said second connecting portions, and said first prism and said second prism are aligned with each other by fitting said first connecting portions and said second connecting portions into these recessed portions.

4. An optical system which forms images on an eye ball of a viewer such that the viewer can observe images of a display element including;

a first prism which has first connecting portions and allows light beams from the display element to pass therethrough, and a second prism which has second connecting portions and allows light beams projected from said first prism to pass therethrough, and said first prism and said second prism being aligned with each other by joining said first connecting portions and said second connecting portions.

5. An optical system according to claim 4, wherein;

said connecting portions include recessed portions into which said first connecting portions are fitted, and said first prism and said second prism are aligned with each other by fitting said first connecting portions into these recessed portions.

6. An optical system according to claim 4, wherein;

said second connecting portions are disposed at the outside of an optical effective range on an incidence surface of said second prism on which light beams projected from said first prism is incident.

7. An optical system according to claim 4, wherein said first connecting portions and said second connecting portions are respectively provided with positioning portions shaped so that said first prism and second prism may be positioned relative to each other in the vertical direction when fixing them, wherein said first connecting portions and said second connecting portions are respectively provided with energy directors and recessed portions, and vice versa, which are brought into contact with each other, and wherein said first and second prism are integrally connected with the use of ultrasonic welding on said energy directors and recessed portions restriction structure includes a depression formed in an inner wall face of said sleeve mating with a part of said head portion.

8. An optical system which forms images on an eye ball of a viewer such that the viewer can observe images of a display element including;

a first prism which allows light beams from the display element to pass therethrough, and a second prism which allows light beams projected from said first prism to pass therethrough, and said first prism and said second prism are formed by an integral molding by way of connecting portions.

9. An optical system according to claim 1, 4 or 8, wherein said first prism has a reflection surface on which the light entering said first prism through an incident and reflection surface thereof is reflected at least twice to be projected from said first prism to a space defined between said first prism and second prism and form images on an optical image plane.

10. An optical system which enables an observation by superposing images of a display element and images of an outer field including;

a prism which constitutes an image forming optical system by having a plurality of surfaces which reflect light and has at least a portion of at least one surface out of a plurality of these surfaces formed into a half mirror surface, and optical members for observing the images of the outer field which is formed on the half mirror surface by a composite molding.

11. An optical system according to claim 10, wherein;

said optical member is formed of an ultraviolet rays curing resin by a composite molding.

12. An optical system according to claim 11, wherein;

said half mirror surface is formed of a plural layered coating and a coating constituting member which is brought into contact with said optical member out of a plurality of coating constituting members which constitute the half mirror surface is formed of silicon dioxide or tungsten trioxide.

13. An optical system which forms images such that images of a display element can be observed including;

a first prism which has a projection surface through which incident light beams from said display element are projected after passing through the inside of said first prism, a second prism which includes an incidence surface through which light beams projected from said first prism enters, and a connecting portion which connects said first prism and said second prism such that said first prism and said second prism are arranged with a given positional relationship.

14. An optical system according to claim 13, wherein;

said connecting portion includes first connecting portions which are formed on or in the vicinity of said projection surface of said first prism, and second connecting portions which are formed on or in the vicinity of said incidence surface of said second prism for connecting said second prism and said first prism while aligning them by directly or indirectly joining second connecting portions with said first connecting portions.

15. An optical system according to claim 14, wherein;

said first connecting portions are integrally molded with the first prism and said second connecting portions are integrally molded with the second prism.

16. An optical system according to claim 14, wherein;

either ones of positioning protrusions or positioning recessed portions are formed on said first connection portions and the other ones of positioning protrusions or positioning recessed portions are formed on said first connection portions, and these first connecting portions and second connecting portions are directly joined and aligned by means of fastening members.

17. An optical system according to claim 14, wherein;

said optical system is provided with a mirror frame which fixedly secures said display element and retains said first prism and said second prism, and said first connecting portions and said second connecting portions are indirectly joined and aligned with each other by way of joining portions formed on said mirror frame.

18. An optical system according to claim 13, wherein;

said first prism, said second prism and said connecting portions are formed by an integral molding.

19. An optical system according to claim 13, wherein;

said given positional relationship is a positional relationship which is determined such that a space is defined between a projection surface of said first prism and an incidence surface of said second prism and an optical image plane is positioned in said space.

20. An optical system according to claim 13, wherein;

said second prism includes a reflection and projection surface which reflects light beams incident through said incidence surface by an inner face thereof and then projects light beams which passes through the inside of said second prism toward an eye ball of a viewer, and a reflection surface which reflects light beams reflected by said reflection and projection surface so as to project the light beams through the reflection and projection surface, and a half mirror surface is formed on at least a portion of said reflection surface and an optical member which leads outside scenery images to an eye ball of a viewer is coated on said half mirror surface by a composite molding.

* * * * *